United States Patent

Marcu

[11] Patent Number: 6,160,921
[45] Date of Patent: Dec. 12, 2000

[54] ERROR DIFFUSION WITH HOMOGENEOUS DISTRIBUTION IN HIGHLIGHT AND SHADOW REGIONS

[75] Inventor: Gabriel G. Marcu, Sunnyvale, Calif.

[73] Assignee: Apple Computer, Inc., Cupertino, Calif.

[21] Appl. No.: 09/094,596

[22] Filed: Jun. 15, 1998

[51] Int. Cl.$^7$ .................................................. G06K 9/36
[52] U.S. Cl. ............................................................ 382/252
[58] Field of Search ................................... 382/252, 237, 382/270, 275; 358/429, 455, 456

[56] References Cited

U.S. PATENT DOCUMENTS

| | | | |
|---|---|---|---|
| 5,045,952 | 9/1991 | Eschbach . | |
| 5,055,942 | 10/1991 | Levien . | |
| 5,353,127 | 10/1994 | Shiau et al. | 358/458 |
| 5,748,785 | 5/1998 | Mantell et al. | 382/237 |
| 5,835,238 | 11/1998 | Mantell | 358/456 |
| 5,917,614 | 6/1999 | Levien | 358/456 |

OTHER PUBLICATIONS

Eschbach, Reiner, "Error Diffusion Algorithm With Homogenous Response In Highlight And Shadow Areas", Journal of Electronic Imaging, Jul. 1997, vol. 6(3), pp. 348–356.

Eschbach, Reiner, "Error Diffusion Algorithm With Reduced Artifacts", Recent Progress in Digital Halftoning, pp. 171–173.

Knox, Keith T. et al, "Threshold Modulation In Error Diffusion", Journal of Electronic Imaging, Jul. 1993, vol. 2(3), pp. 185–192.

Ulichney, Robert, "Error Diffusion With Perturbation", Digital Halftoning, The MIT Press, pp. 265–324.

Zeggel, Thomas et al, "Halftoning With Error Diffusion On An Image–Adaptive Raster", Journal of Electronic Imaging, Jul. 1994, vol. 3(3), pp. 288–294.

*Primary Examiner*—Phuoc Tran
*Attorney, Agent, or Firm*—Burns, Doane, Swecker & Mathis, L.L.P.

[57] ABSTRACT

To eliminate artifacts resulting from the quantization of images by means of an error diffusion process, a determination is made whether a current pixel being processed is within a shadow or highlight region of an image. If so, a dot of a complementary value is placed in the region only if a distance constraint between the current pixel and neighbor dots is satisfied. If the distance constraint is not satisfied, the placement of the dot is postponed. The distance constraint is based upon the grayscale level of the current pixel. A road map for determining the distance to other dots is defined in a manner such that it expands further from the location of the current pixel as the grayscale value of that pixel approaches the extreme limits of the grayscale range. As a result, a homogenous distribution of dots in highlight and shadow regions of an image is produced.

26 Claims, 3 Drawing Sheets

ERROR DIFFUSION WITH HOMOGENEOUS DISTRIBUTION IN HIGHLIGHT AND SHADOW REGIONS

FIELD OF THE INVENTION

The present invention is directed to image processing, and more particularly to the reduction of artifacts that result from the quantization of image data.

BACKGROUND OF THE INVENTION

In the processing of images for various purposes, such as compression, transmission, storage and reproduction, it is often necessary to quantize the data which defines an image. For instance, the individual picture elements, or pixels, of a monochrome image might be defined by eight-bit grayscale values which define a range of 0–255. The lowest grayscale value might represent pure black, and the highest grayscale value is conversely defined as pure white. All of the intermediate values in the range 1–254 define grayscale values having proportionate mixtures of black and white. While it is possible to separately display each of these individual grayscale values on a CRT monitor or the like, most printers are not capable of discretely representing such a large range of values. Accordingly, when the image is to be printed, it is necessary to quantize the eight-bit grayscale values to a lesser number of levels that can be accommodated by the printer. For example, if the printer is only capable of printing uniform black dots, all of the grayscale values must be converted to a binary value, i.e. zero or one.

One form of conversion is to perform a simple thresholding operation, in which each grayscale value is individually rounded up or down to the closest binary value. However, such an approach results in high contrast images which lack any tonal qualities. Accordingly, more sophisticated quantization approaches have been developed in an effort to more accurately reproduce the tonal characteristics of an image. One such approach is known as error diffusion. Basically, in the error diffusion process, the difference between the actual grayscale value of a pixel and its quantized value is determined, and this difference, or error, is added to one or more neighboring pixels in the image. As a result of this process, most of the pixels in a shadow region of an image might be quantized to a value of zero, but a certain number of pixels in the region are converted to a value of one. More particularly, white dots are dispersed throughout a predominantly black region, to create the impression of an intermediate grayscale level within the region. The converse effect occurs in highlight regions, where black dots are distributed throughout an otherwise white region.

While the error diffusion process functions to increase the tonal characteristics of a reproduced image, it can also lead to certain artifacts within the image. One artifact of particular concern is known as a "worm" artifact, which is most prevalent in the shadow and highlight regions of an image. In general, the highlight and shadow regions of an image are considered to be those portions of the image represented by grayscale levels which are within about 15% of the minimum and maximum grayscale levels in the image. In the context of the present invention, the term "dot" is used to identify a white pixel in a shadow region, or a black pixel in a highlight region. In other words, a dot has a quantized value which is complementary to the grayscale values associated with the region. Since dots are relatively rare in the highlight and shadow areas, they can be readily perceived by a viewer if they are spaced too closely to one another. Often, they are perceived as arbitrarily shaped lines, or "worms", rather than a uniform gray level that they are intended to represent.

Various methods have been proposed in the past to reduce or eliminate "worm" artifacts and the like. Examples of such proposed methods include modulation of the error diffusion threshold with noise, or processing the image with a serpentine scanning procedure, or the like. However, these proposed methods have not been totally successful in attempts to eliminate the artifacts.

SUMMARY OF THE INVENTION

The present invention eliminates artifacts in quantized images, particularly those artifacts which are readily perceptible in highlight and shadow regions of an image, while preserving the tonal preservation advantages of error diffusion. Generally speaking, in the error diffusion process of the present invention, spatial constraints are imposed on the placement of dots in highlight and shadow regions of an image, to create a more homogenous distribution of the dots in these regions. The spatial constraints inhibit the dot pixels from being arranged in viewer-perceptible patterns, such as "worms".

In the implementation of the invention, a determination is made whether a current pixel being processed is within a shadow or highlight region of an image. If so, a dot is placed in this region only if a distance constraint between the current pixel and neighboring dots is satisfied. If the distance constraint is not satisfied, the placement of the dot is postponed, and quantization error is diffused to other pixels, in a conventional manner.

In accordance with a further feature of the invention, the distance constraint is based upon the original grayscale level of the current pixel. As the grayscale level to be represented approaches the limits of the grayscale range, e.g. 0 or 255 in an eight-bit system, the minimum distance between dots increases. This minimum distance can be geometrically calculated on the basis of the pixel's grayscale value. In a more preferred approach, however, a road map, or path, for determining the distance to other dots is defined in a manner such that it expands further from the location of the current pixel as the grayscale level of that pixel approaches the extreme limits of the grayscale range. This path can be precalculated and stored in a lookup table, thereby providing a more efficient and less computationally intensive approach to examining the neighboring pixels for the distance constraint.

Further features of the invention, and the advantages provided thereby, are explained in detail hereinafter with reference to a preferred embodiment illustrated in the accompanying drawings.

DETAILED DESCRIPTION

To facilitate an understanding of the present invention, it is described hereinafter with reference to a particular example in which a monochrome image, having 8-bit grayscale values in the range 0–255, undergoes error diffusion processing to convert the grayscale values to binary data. It will be appreciated, however, that the practical applications of the present invention are not limited to this particular example. For instance, if a printer is capable of printing multi-level dots on a page, the image data values can be quantized to multiple levels, consistent with the capacity of the printer, rather than to binary data. Accordingly, the following description should be viewed as a relatively simple example which illustrates the principles of the invention, rather than as a limitation thereon.

Figure 1:
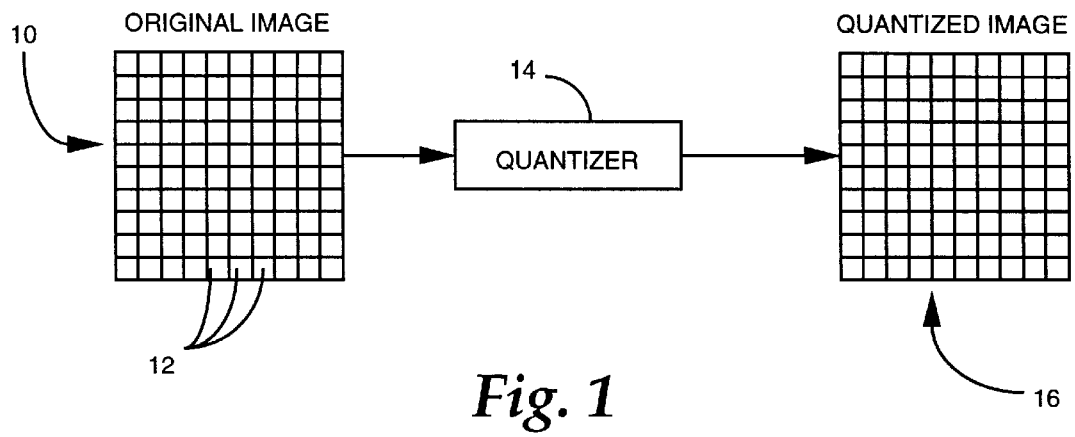
FIG. 1 is a general block diagram of an image quantization system.

As a background to the discussion of the invention, a brief overview of the error diffusion process will first be provided. Referring to the exemplary embodiment of FIG. 1, an original image 10 is comprised of an array of picture elements 12, or pixels, each having an associated grayscale value. For instance, the grayscale value can be defined by in eight-bit word, thereby providing a range of 256 grayscale levels. In this particular example, a grayscale level of 0 is defined as pure black, and a grayscale level of 255 is representative of pure white. The values 1–254 represent successive grayscale levels between black and white. The grayscale value for each pixel is stored in memory, for example in the form of a bitmap.

If the image is to be printed, the grayscale values must be converted to binary values, i.e. 0 or 1, to control the application of ink or toner by the printer. For this purpose, the individual pixel values of the image 10 are sequentially fed to a quantizer 14, which converts them to binary values. The result of this operation is a quantized image 16, each of whose pixels has a value of 0 or 1. The quantized image values are likewise stored in memory as a bitmap or the like.

Within the quantizer 14, an error diffusion process is carried out to convert the grayscale values of the original image into the binary values of the quantized image. The error diffusion process is schematically depicted in the block diagram of FIG. 2. Referring thereto, the individual grayscale values for the pixels of the original image 10 are serially fed to the quantizer, for example in the manner of a raster scan. The grayscale value $P_{x,y}$ for the pixel at coordinate position (x,y) is first presented to an adder 18, where it is algebraically summed with an error value from one or more previously processed pixels, to generate a modified pixel value $M_{x,y}$. The modified pixel value is then presented to a comparator 20, to determine whether it is greater or less than a threshold value. In the context of the present example, in which the grayscale values occupy a range of 0–255, the threshold comparison might determine whether the modified pixel value is greater than 127. If it is, a quantized pixel value $Q_{x,y}$ is generated, having a binary value of 1. Conversely, if the modified pixel value $M_{x,y}$ is less than or equal to 127, the quantized pixel value $Q_{x,y}$ is equal to 0. These quantized pixel values are stored in a suitable memory 22, to represent the quantized image 16.

The modified pixel value $M_{x,y}$ and the quantized pixel value $Q_{x,y}$ are each fed to an error calculating circuit 24. The error calculating circuit determines the difference between the modified pixel value and the grayscale equivalent of the quantized pixel value, i.e. 0 or 255. The calculated error is supplied to a buffer 26. The buffer 26 stores the error calculated for the pixel at position (x,y) for application to subsequently processed pixels which are adjacent to the current pixel. For instance, in a simple application of the error diffusion process, the total error can be added to the next pixel to be processed, e.g. the pixel at position (x+1,y). In this case, the buffer 24 only needs to store the error value for the most recently processed pixel. In a more elaborate embodiment, the error calculated by the unit 24 can be evenly distributed to each of four adjacent pixels, for instance the pixels at positions (x+1, y), (x−1, y+1), (x, y+1) and (x+1, y+1). Of course, it will be appreciated that the calculated error can be spread over a much larger number of neighboring pixels. Furthermore, the error need not be evenly distributed among the various pixels. Rather, the portion of the calculated error that is applied to each pixel can be weighted in accordance with its distance from the current pixel of interest, or some other suitable function.

As a result of this process, the differences between the actual grayscale value of a pixel and its quantized value are distributed throughout the neighboring region of the image, to improve the overall tonal quality of the image. In other words, in an area which consists primarily of quantized pixels having a black value of 0, the accumulation of the error values will periodically cause a white pixel having a value of 1 to be generated. These white pixels will be dispersed throughout the area, to create the perception of a region of intermediate grayscale value, rather than pure black. As the original grayscale values get closer to black, fewer white pixels are distributed throughout the region.

At the ends of the grayscale range, the error diffusion processing of an image can result in certain artifacts. In particular, in a highlight area of an image, the presence of multiple black pixels that are located close to one another will be perceived as a line of arbitrary shape, sometimes referred to as a "worm". In an analogous manner, a number of white pixels that are closely grouped together in a shadow area will create the same effect. In the context of the present invention, the highlight and shadow regions of an image are considered to be those areas whose grayscale values lie within about 10–15% of the pure white and pure black grayscale levels. Thus, in the eight-bit example described herein, the shadow region of an image is considered to be those portions of the image whose grayscale values are less than a threshold in the range 25–40, and the highlight regions are those whose pixels have a grayscale value above a limit in the range 230–255. A white pixel in a predominantly shadow region, and a black pixel in a highlight region, will be referred to hereinafter as a "dot". In essence, a dot has a quantized value which is complementary to the predominant quantization value of neighboring pixels in a region.

To eliminate artifacts in the shadow and highlight regions of an image, a constraint is placed on the minimum distance that is permitted between dots. The permissible location for a dot is determined by examining previously processed pixels in the neighborhood of the current pixel, and deciding whether any of those pixels already have a dot value, i.e. a white pixel in a shadow region, or a black pixel in a highlight region. If any of the pixels in the neighborhood has a dot value, a dot is prohibited from being placed at the current pixel. If, however, no dot is present along the path, a dot can be placed at the current pixel.

For any given pixel that is being processed, the size of the neighborhood, i.e. the number of pixel locations to be evaluated, is determined by the grayscale value for that pixel. The closer the grayscale value of the pixel is to the extreme values of black or white, the greater the size of the neighborhood. It is possible to use geometric calculations to determine the size of the neighborhood to be examined for the current pixel. However, such an approach can be computationally expensive. In a preferred embodiment of the invention, the neighboring pixels to be examined for the presence of a dot are determined by following a predefined pixel path. This approach employs a simple addressing technique, and thereby avoids the need to compute the geometric distance between the current pixel and each pixel to be examined.

Figure 3A:
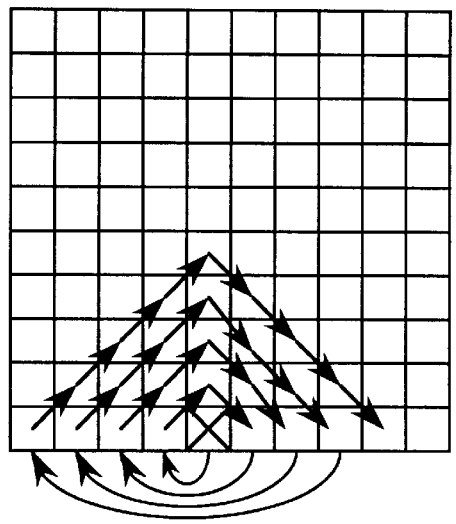
FIG. 3a and 3b are graphic and numerical representations, respectively, of the dot spacing road map.
Figure 3B:
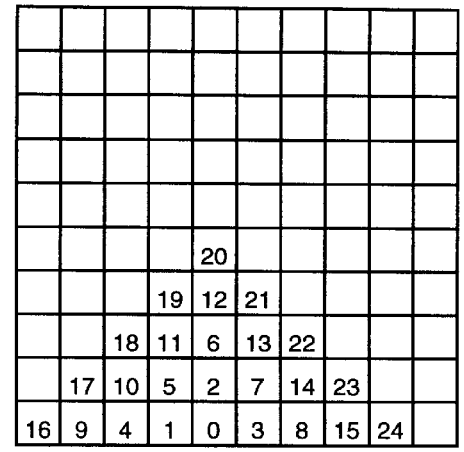

The pixel path, which is referred to herein as a "road map", originates with the current pixel of interest, and covers an expanding area about the pixel. Referring to FIG. 3a, the current pixel of interest is marked with an "X", and the road map is depicted by the arrows. The numerical sequence of the pixels in the road map is illustrated in FIG. 3b, in which the current pixel, or starting point of the road map, has a value of zero. As can be seen, the road map begins with the current pixel, and proceeds to the pixels that are immediately adjacent the current pixel. The path followed by the road map continues in an outwardly expanding fashion therefrom. In the particular example illustrated in FIGS. 3a and 3b, each successive segment of the path has a triangular shape. Alternative shapes can be employed for the path as well. For example, the path of pixels could have a semicircular shape, or a semi-elliptical shape. In general, the path constitutes quasi-semicircular arcs of ever-increasing radius which are centered on the current pixel of interest.

To determine the road map for an image, the (x,y) coordinates of the pixels which constitute the road map are preferably computed once, and then stored in a first look-up table. The coordinates for successive pixels in the road map are associated with incrementing index values. An example for the first one hundred road map locations that might be stored in such a look-up table for the example of FIGS. 3a and 3b is illustrated in the following Table 1.

TABLE 1

| Index | Coordinates |
|---|---|
| 0 | 0, 0 |
| 1 | −1, 0 |
| 2 | 0, 1 |
| 3 | 1, 0 |
| 4 | −2, 0 |
| 5 | −1, 1 |
| 6 | 0, 2 |
| 7 | 1, 1 |
| 8 | 2, 0 |
| 9 | −3, 0 |
| 10 | −2, 1 |
| 11 | −1, 2 |
| 12 | 0, 3 |
| 13 | 1, 2 |
| 14 | 2, 1 |
| 15 | 3, 0 |
| 16 | −4, 0 |
| 17 | −3, 1 |
| 18 | −2, 2 |
| 19 | −1, 3 |
| 20 | 0, 4 |
| 21 | 1, 3 |
| 22 | 2, 2 |
| 23 | 3, 1 |
| 24 | 4, 0 |
| 25 | −5, 0 |
| 26 | −4, 1 |
| 27 | −3, 2 |
| 28 | −2, 3 |
| 29 | −1, 4 |
| 30 | 0, 5 |
| 31 | 1, 4 |
| 32 | 2, 3 |
| 33 | 3, 2 |
| 34 | 4, 1 |
| 35 | 5, 0 |
| 36 | −6, 0 |
| 37 | −5, 1 |
| 38 | −4, 2 |

TABLE 1-continued

| Index | Coordinates |
|---|---|
| 39 | −3, 3 |
| 40 | −2, 4 |
| 41 | −1, 5 |
| 42 | 0, 6 |
| 43 | 1, 5 |
| 44 | 2, 4 |
| 45 | 3, 3 |
| 46 | 4, 2 |
| 47 | 5, 1 |
| 48 | 6, 0 |
| 49 | −7, 0 |
| 50 | −6, 1 |
| 51 | −5, 2 |
| 52 | −4, 3 |
| 53 | −3, 4 |
| 54 | −2, 5 |
| 55 | −1, 6 |
| 56 | 0, 7 |
| 57 | 1, 6 |
| 58 | 2, 5 |
| 59 | 3, 4 |
| 60 | 4, 3 |
| 61 | 5, 2 |
| 62 | 6, 1 |
| 63 | 7, 0 |
| 64 | −8, 0 |
| 65 | −7, 1 |
| 66 | −6, 2 |
| 67 | −5, 3 |
| 68 | −4, 4 |
| 69 | −3, 5 |
| 70 | −2, 6 |
| 71 | −1, 7 |
| 72 | 0, 8 |
| 73 | 1, 7 |
| 74 | 2, 6 |
| 75 | 3, 5 |
| 76 | 4, 4 |
| 77 | 5, 3 |
| 78 | 6, 2 |
| 79 | 7, 1 |
| 80 | 8, 0 |
| 81 | −9, 0 |
| 82 | −8, 1 |
| 83 | −7, 2 |
| 84 | −6, 3 |
| 85 | −5, 4 |
| 86 | −4, 5 |
| 87 | −3, 6 |
| 88 | −2, 7 |
| 89 | −1, 8 |
| 90 | 0, 9 |
| 91 | 1, 8 |
| 92 | 2, 7 |
| 93 | 3, 6 |
| 94 | 4, 5 |
| 95 | 5, 4 |
| 96 | 6, 3 |
| 97 | 7, 2 |
| 98 | 8, 1 |
| 99 | 9, 0 |

For any given pixel that is being processed, the length of the road map, which indicates the number of pixel locations to be evaluated, is determined by the grayscale value for that pixel. This relationship between grayscale values and path length is preferably stored in a second look-up table. Exemplary values for the first 50 locations in such a look-up table are illustrated in the following Table 2. Depending upon the particular parameters that are employed for the quantization threshold and error diffusion, different sets of values might be employed in such a table.

TABLE 2

| Grayscale | Length |
|---|---|
| 0 | 0 |
| 1 | 148 |
| 2 | 111 |
| 3 | 92 |
| 4 | 79 |
| 5 | 70 |
| 6 | 63 |
| 7 | 57 |
| 8 | 52 |
| 9 | 48 |
| 10 | 44 |
| 11 | 41 |
| 12 | 38 |
| 13 | 35 |
| 14 | 32 |
| 15 | 30 |
| 16 | 28 |
| 17 | 26 |
| 18 | 24 |
| 19 | 22 |
| 20 | 20 |
| 21 | 19 |
| 22 | 18 |
| 23 | 17 |
| 24 | 16 |
| 25 | 15 |
| 26 | 14 |
| 27 | 13 |
| 28 | 12 |
| 29 | 11 |
| 30 | 10 |
| 31 | 9 |
| 32 | 8 |
| 33 | 7 |
| 34 | 6 |
| 35 | 5 |
| 36 | 4 |
| 37 | 3 |
| 38 | 2 |
| 39 | 1 |
| 40 | 0 |
| 41 | 0 |
| 42 | 0 |
| 43 | 0 |
| 44 | 0 |
| 45 | 0 |
| 46 | 0 |
| 47 | 0 |
| 48 | 0 |
| 49 | 0 |
| 50 | 0 |

Figure 4:
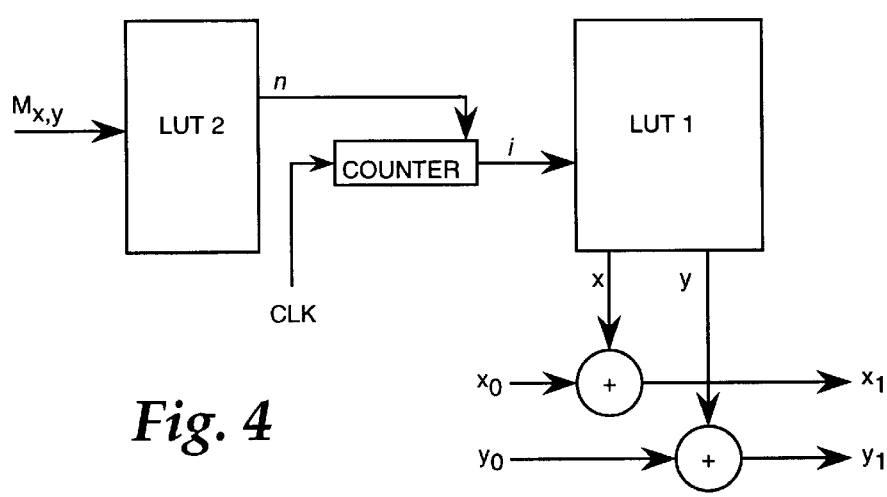
FIG. 4 is a block diagram of the system for generating pixel coordinates to be examined along a road map.

An overview of the computation of the road map for an input pixel is provided in the block diagram of FIG. 4. Referring thereto, for a given pixel to be processed, its modified grayscale value $M_{x,y}$ functions as an index to the second look-up table LUT2. This table produces an output value n, which defines the number of road map locations that are to be examined, to see if a dot is already present within the minimum distance for that pixel. A counter produces index values i which incrementally access each entry in the first look-up table LUT1 from 0 to n, to retrieve the (x,y) coordinates for each successive pixel along the road map. For each pair of (x,y) road map coordinates, the coordinates of the corresponding neighbor pixel of the current pixel are computed by offsetting the (x,y) road map coordinates with the coordinates of the current pixel location. In the diagram of FIG. 4, the coordinates of the current pixel are defined as $(x_0, y_0)$, and the coordinates of the neighbor pixel to be examined are identified as $(x_1,y_1)$. Each of the n neighbors of the current pixel is checked to determine whether a dot already exists at the location of that neighboring pixel. If, within the first n neighbors of the current pixel, a dot is detected, the process is interrupted, and the placement of a dot at the current pixel is prohibited. On the other hand, if no dot is detected within the first n neighboring pixels, a dot is placed at the location of the current pixel. In either case, the quantizer error is computed, and this error is diffused to subsequent pixels, in the normal manner.

Figure 2:
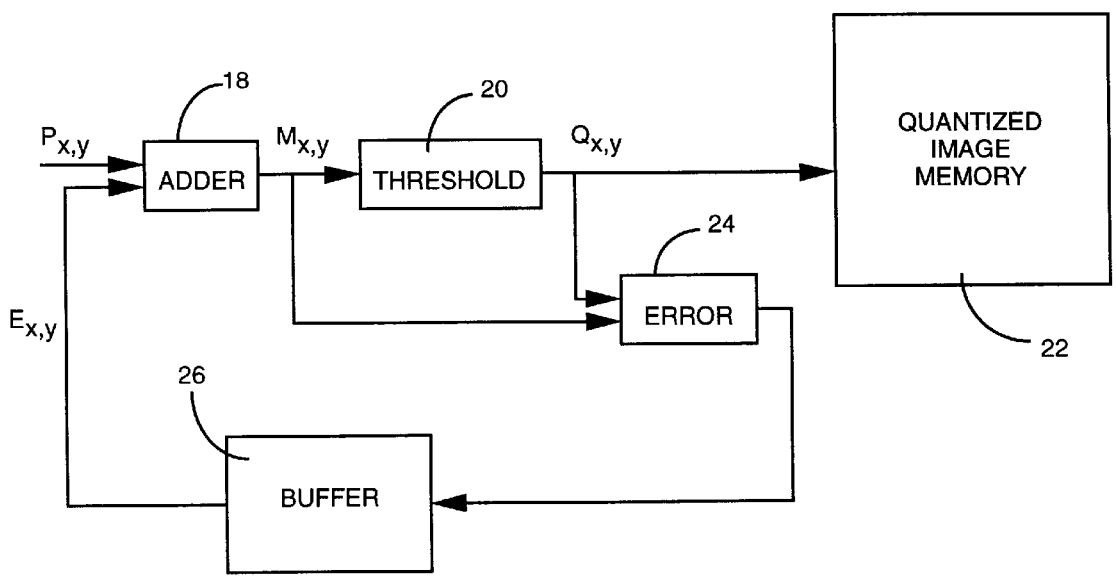
FIG. 2 is a more detailed block diagram of an error diffusion system.

In the examples of FIGS. 2 and 4, the error diffusion process and road map calculation are depicted as being performed by various individual components. In a practical implementation, the quantizer 14, which carries out the error diffusion process of the present invention, can be embodied in a processor that is controlled by a program stored in a suitable computer-readable medium, such as a magnetic disk or random-access memory.

Figure 5:
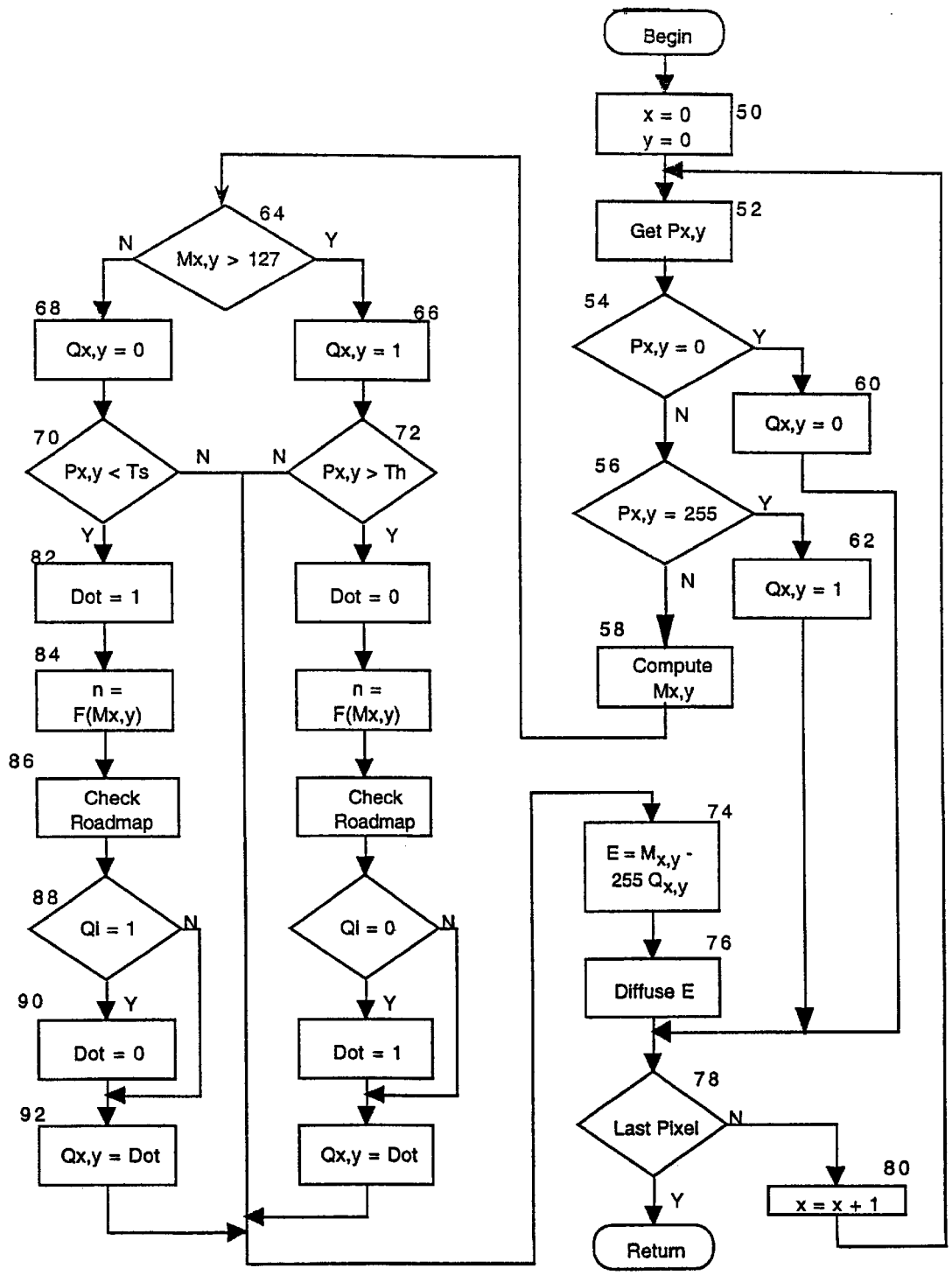
FIG. 5 is a flow chart of the error diffusion process of the present invention.

The error diffusion process as conducted in accordance with such a program is depicted in greater detail in the flow chart of FIG. 5. Referring thereto, the error diffusion process begins at Step 50, in which the x and y coordinate values are set to 0. At Step 52, the grayscale value for the first pixel, $P_{0,0}$, is retrieved. At Steps 54 and 56, a determination is made whether the original pixel value is one of the extreme cases for pure black or pure white. If the pixel value is one of these two extreme cases, there is no need to carry out any further processing of the pixel. In these two cases, therefore, the quantized pixel value, $Q_{x,y}$, is set to 0 or 1, as appropriate, and the process proceeds to the next pixel.

If, however, the current pixel does not represent either pure black or pure white, the modified pixel value $M_{x,y}$ is computed at Step 58. As described previously, the modified pixel value is computed by adding the diffused error value, $E_{x,y}$, to the actual pixel value. In the case of the first pixel of the image, however, no previously diffused error values have been computed, and therefore the modified pixel value is the same as the original pixel value.

The process then proceeds to Step 64, where the modified pixel value undergoes a threshold decision. In this particular example, a determination is made whether the modified pixel value is greater than the value 127. If it is, the quantized pixel value is set to 1, at Step 66. Conversely, if the modified pixel value is equal to or less than 127, the quantized pixel value is set to 0 at Step 68. Thereafter, a determination is made whether the current pixel of interest is in a shadow or highlight region. For the case of the shadow region, a determination is made whether the original pixel value $P_{x,y}$ is less than a shadow threshold value $T_s$, at Step 70. The shadow threshold value can be any user-selected value. For the eight-bit example discussed herein, the threshold value $T_s$ is preferably in the range of 25–40.

In a similar manner, pixels whose modified values are greater than 127 are checked to determine whether they are in the highlight region, at Step 72. This determination is carried out by comparing the original pixel value $P_{x,y}$ to a highlight threshold value $T_h$. For the eight-bit example discussed herein, the highlight threshold value might be in a range of 215–230.

If the current pixel is not in a shadow or highlight region, error diffusion processing continues in a normal manner. Specifically, the error E is calculated at Step 74, and then stored in a buffer at Step 76 to be diffused to neighboring pixels, as described previously. Thereafter, a determination is made whether the current pixel is the last pixel of the image, at Step 78. If it is the last pixel, the process ends, and returns to the main routine that called it. If the current pixel is not the last pixel, the coordinate value for x is incremented at Step 80, and the next pixel is retrieved at Step 52. Although not illustrated in FIG. 5, when the x value is equal to the total number of pixels in a row of the image, the x coordinate value is reset to 0, and the y coordinate value is incremented by 1.

If a determination is made at either Step 70 or 72 that the current pixel is in a shadow or highlight region, processing proceeds in accordance with the present invention. Referring to the case in which the pixel is in a shadow region, as determined at Step 70, a variable "dot" is set to a value of 1. Thereafter, the road map length n is determined as a function of the modified grayscale value for the current pixel, by reference to the look-up table, LUT2. At Step 86, the first n coordinate locations of the road map are computed, with reference to the look-up table, LUT1, as depicted in FIG. 4. For each computed coordinate location along the road map, the quantized value for that pixel, $Q_i$, is examined to determine whether a white dot has already been placed at that location, i.e. whether the quantized value is equal to 1. If so, the variable "dot" is reset to 0. If no white dot is detected along the road: map, however, the variable "dot" remains at a value of 1. After all of the locations at along the road map have been checked, the quantized value for the current pixel, $Q_{x,y}$, is set to be equal to the value of the variable "dot". In other words, if no white dot was detected along the length of the road map, a white dot is placed at the current pixel. However, if a white dot had been detected along the road map, the current pixel is set to a black value, and the placement of a white dot is postponed.

The converse process is carried out in the case of the highlight region. In this situation, the road map is checked for the presence of a black dot, and if no black dot is detected, the current dot is set to the value for black. Thereafter, the procedure continues to Step 74, so that the remainder of the error diffusion process is carried out in a normal fashion.

From the foregoing, it can be seen that the present invention functions to provide a homogenous distribution of dots in highlight and shadow regions, by imposing a minimum distance constraint between neighboring dots. This constraint is based upon the grayscale values of the pixels, to thereby preserve the tonal characteristics that are provided by the error diffusion process. Thus, as the grayscale values of pixels approach the extreme values of black or white, the spacing between dots increases, to thereby eliminate artifacts which might be otherwise readily observed in these regions.

In the foregoing example, the determination whether a pixel lies in a highlight or shadow region, as well as the calculation of the length of the road map, is based upon the value of the current pixel. If desired, either one or both of these calculations can be based upon a larger data sample. For instance, it might be feasible to use the average value of a 3×3 array of pixels to determine whether the current pixel is in a highlight or shadow region. Similarly, such an average value can be employed to select the length of the road map.

It will be appreciated by those of ordinary skill in the art that the invention can be embodied in other forms without departing from the spirit or essential characteristics thereof. For example, while an exemplary embodiment of the invention has been described in the context of the binarization of eight-bit grayscale data, the principles of the invention are equally applicable in other contexts in which image data is quantized by means of an error diffusion process. Thus, for example, the original grayscale range may be less than or greater than that which is defined by an eight-bit value. Similarly, the quantized values may have multiple levels, rather than be binarized data. In addition, the image data could represent color, as well as monochrome grayscale values. The presently disclosed embodiments are therefore considered in all respects to be illustrative and not restrictive. The scope of the invention is indicated by the appended claims, rather than the foregoing description, and all changes that come within the meaning and range of equivalence thereof are intended to be embraced therein.

What is claimed is:

1. A method for quantizing image data, comprising the steps of:
    retrieving image data for a selected pixel of an image;
    determining whether the selected pixel lies within a highlight or shadow region of the image;
    detecting whether another pixel within a predetermined distance of the selected pixel has a quantized value representative of a dot that is complementary to the determined region of the image, when the selected pixel is determined to be in a highlight or shadow region of the image;
    quantizing the image data for the selected pixel to a value representative of a dot that is complementary to the determined region of the image if no other pixel within said predetermined distance has a quantized value representative of a dot that is complementary to the determined region of the image; and
    otherwise quantizing the image data for the selected pixel to a value associated with the determined region of the image.

2. The method of claim 1 wherein said predetermined distance is related to the magnitude of the image data for the selected pixel.

3. The method of claim 2 wherein the predetermined distance increases as the magnitude of the image data approaches an extreme value for the image data.

4. The method of claim 1 wherein selected pixel is determined to be in a highlight or shadow region of an image if the magnitude of the image data is within a predetermined range adjacent an extreme value for the image data.

5. The method of claim 4 wherein said predetermined range is approximately 15% of the total range of image data.

6. A method for quantizing image data, comprising the steps of:
    retrieving an image data value for a selected pixel of an image;
    determining an initial quantization value for the selected pixel, based upon its image data value;
    defining a region of image pixels which are adjacent the selected pixel, wherein the number of pixels in said region is determined by an image data value for the selected pixel;
    detecting whether any of the pixels in said region has a quantized value which is the same as the initial quantization value for the selected pixel; and
    changing the quantization value for the selected pixel to a value different from said initial quantization value if any of the pixels in said region is the same as said initial quantization value.

7. The method of claim 6 wherein said region is defined by a path of pixels which extends progressively outward from the selected pixel.

8. The method of claim 7 wherein the length of said path is determined by image data for the selected pixel.

9. The method of claim 6 further including the step of determining whether the retrieved image data value is within a predetermined range of data values, and changing said quantization value only if said retrieved data value is within said range.

10. The method of claim 9 wherein said range of data values is associated with highlight and shadow regions of an image.

11. A system for quantizing image data comprising:
an error diffusion processor which processes pixel data values in accordance with quantization errors to generate modified pixel values;
a first look-up table storing path length values that are associated with modified pixel values;
a second look-up table storing pixel position values that are associated with said path length values; and
a quantization processor which generates quantized pixel values from said modified pixel values, and which examines quantized pixel values along a path of pixels in an image which are selected in accordance with the values stored in said look-up tables to selectively prohibit predetermined quantized values from being generated.

12. The system of claim 11 wherein said quantization processor prohibits a quantized pixel value which is complementary to the values of adjacent pixels from being generated if a pixel along said path has said complementary value.

13. The system of claim 11 wherein said quantization processor selectively prohibits said predetermined quantized values from being generated only when a pixel value is within a predetermined range of pixel values.

14. The system of claim 13 wherein said predetermined range is within approximately 15% of the extreme values in the total range of pixel values.

15. A system for quantizing image data comprising:
an error diffusion processor which processes image data values in accordance with quantization errors to generate modified data values;
a memory storing neighborhoods of pixel positions that are respectively associated with modified data values; and
a quantization processor which generates quantized data values from said modified data values, and which examines quantized data values within a neighborhood of pixels in an image which are selected in accordance with the modified data value for a given pixel to selectively prohibit predetermined quantized values from being generated for said given pixel.

16. The system of claim 15 wherein said quantization processor prohibits a quantized value which is complementary to the values of adjacent pixels from being generated for said given pixel if a pixel within said neighborhood has said complementary value.

17. The system of claim 15 wherein said quantization processor selectively prohibits said predetermined quantized values from being generated only when a data value for said given pixel is within a predetermined range of data values.

18. The system of claim 17 wherein said predetermined range is within approximately 15% of the extreme values in the total range of data values.

19. A computer readable medium containing a program which executes the steps of:
determining whether retrieved image data for a selected pixel of an image represents a predetermined type of image data;
detecting whether another pixel within a predefined distance of the selected pixel has a quantized value representative of a dot that is complementary to the predetermined type of image data, when the retrieved image data is determined to represent said predetermined type of image data;
quantizing the image data for the selected pixel to a value representative of a dot that is complementary to said predetermined type of image data if no other pixel within said predetermined distance has a quantized value representative of a dot that is complementary to the predetermined type of image data; and
otherwise quantizing the image data for the selected pixel to a value associated with the predetermined type of image data.

20. The computer readable medium of claim 19 wherein said predetermined type of image data is associated with highlight and shadow regions of an image.

21. The computer readable medium of claim 19 wherein said predetermined type of image data has a value within approximately 15% of the extreme values in the total range of data values.

22. A computer readable medium containing a program which executes the steps of:
determining an initial quantization value for a selected pixel of an image, based upon its image data value;
defining a region of image pixels which are adjacent the selected pixel, wherein the number of pixels in said region is determined by an image data value for the selected pixel;
detecting whether any of the pixels in said region has a quantized value which is the same as the initial quantization value for the selected pixel; and
changing the quantization value for the selected pixel to a value different from said initial quantization value if any of the pixels in said region is the same as said initial quantization value.

23. The computer readable medium of claim 22 wherein said region is defined by a path of pixels which extends progressively outward from the selected pixel.

24. The computer readable medium of claim 23 wherein the length of said path is determined by image data for the selected pixel.

25. The computer readable medium of claim 22 further including the step of determining whether the retrieved image data value is within a predetermined range of data values, and changing said quantization value only if said retrieved data value is within said range.

26. The computer readable medium of claim 25 wherein said range of data values is associated with highlight and shadow regions of an image.

* * * * *